United States Patent
College

Patent Number: 5,380,505
Date of Patent: Jan. 10, 1995

[54] PRODUCTION OF LOW SULFUR CONTENT LIME FROM LIMESTONE

[75] Inventor: John W. College, Pittsburgh, Pa.

[73] Assignee: Dravo Lime Company, Pittsburgh, Pa.

[21] Appl. No.: 132,807

[22] Filed: Oct. 7, 1993

[51] Int. Cl.$^6$ .............................................. C01F 11/06
[52] U.S. Cl. ........................ 423/175; 423/177; 423/637
[58] Field of Search ..................... 423/175, 177, 637

[56] References Cited

U.S. PATENT DOCUMENTS

| | | | |
|---|---|---|---|
| 3,345,052 | 10/1967 | Hall | 423/177 |
| 3,499,636 | 3/1970 | Hall | 423/175 |
| 3,617,583 | 11/1971 | Moss et al. | |
| 4,220,631 | 9/1980 | Serbent et al. | |
| 4,259,081 | 3/1981 | Reuter et al. | 423/177 |
| 4,368,177 | 1/1983 | Schnabel et al. | 423/175 |
| 4,391,671 | 7/1983 | Azarniouch | |
| 4,548,796 | 10/1985 | Weber | |
| 4,626,418 | 12/1986 | College et al. | |

FOREIGN PATENT DOCUMENTS 3744  1/1982  Japan ........................... 423/637

Primary Examiner—Wayne Langel
Attorney, Agent, or Firm—Armstrong, Westerman, Hattori, McLeland & Naughton

[57] ABSTRACT

A process for calcining limestone to lime to produce a low sulfur content lime product, while combusting a sulfur-containing carbonaceous fuel in a rotary kiln to provide heat for the calcination. A finely divided lime hydrate is added to the rotary kiln adjacent the combustion flame, such that the lime hydrate particles react with sulfur-containing contaminants in the hot combustion gases to form lime hydrate-sulfur reaction products, such as calcium sulfate, which are retained in the gaseous flow and removed from the rotary kiln.

17 Claims, 1 Drawing Sheet

PRODUCTION OF LOW SULFUR CONTENT LIME FROM LIMESTONE

FIELD OF THE INVENTION

The present invention relates to a process for producing a low sulfur content lime product by calcination of limestone while using hot combustion gases containing sulfur, and more specifically to a process for calcining limestone to lime using hot combustion gases resulting from the combustion of coal, by the addition of finely divided lime hydrate particles to the combustion gases to react with and remove sulfur contaminants in the gases.

BACKGROUND OF THE INVENTION

The presence of sulfur in lime products produced from the calcining of limestone is a persistent problem where metallurgical lime is desired. Lime used in metallurgical processes, such as steel making, as a fluxing material is required to have a sulfur content as low as possible. Such sulfur can be present either in the limestone which is calcined, or in the fuel that is used to produce the hot combustion gases for calcination, with such sulfur generally present as sulfur dioxide in the hot gases. Steel mills typically require lime that is very low in sulfur, usually lower than 0.1 percent and often as low as 0.03 percent.

When sulfur present in the coal combusted to form the hot gases for calcination, usually as sulfur dioxide, reacts with calcining lime, calcium sulfate is formed as follows:

$$CaO + SO_2 + \tfrac{1}{2}O_2 \rightarrow CaSO_4$$

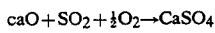

Such a reaction occurs during combustion when excess air is used. Thus, some of the sulfur originally present in the carbonaceous fuel ends up as part of the lime product produced, while some also is carried through the calcining system and ends up in the exhaust gas cleaning apparatus of a calcining kiln system, typically a bag house or an electrostatic precipitator.

In addition, as above described, the limestone charge to a rotary kiln may contain sulfur compounds, primarily as pyrites, which upon calcination of the stone will produce sulfur dioxide, with oxygen present, generally according to the formula:

$$5\tfrac{1}{2}O_2 + 2FeS_2 + heat \rightarrow Fe_2O_3 + 4SO_2$$

which requires the need to keep any sulfur affects of the carbonaceous feed at a minimum.

Where the rotary lime kiln system contains a preheater for the limestone charged, using direct contact of the limestone with hot combustion gases exiting the kiln, sulfur dioxide in the combustion gases can combine with the surface areas of the limestone charge, especially the particles that are calcined on the surface and are most reactive.

Because of the disastrous affect of sulfur in lime used in steel fluxes, where coal is used as a fuel in a calcining system a very low sulfur content coal, an expensive commodity, is used. In addition to the added cost involved using very low sulfur content coal, even slight variations in coal chemistry can cause formation of a less desirable lime product.

It is an object of the present invention to provide a process for calcination of limestone to lime to produce a very low sulfur content lime product while using sulfur-containing fuels, such as sulfur-containing coal, for combustion in a rotary lime kiln to provide heat required for the calcination.

SUMMARY OF THE INVENTION

Limestone is calcined in a rotary kiln to produce a very low sulfur content lime product even where the limestone contains sulfur components and where a sulfur-containing carbonaceous fuel is combusted to provide heat for the calcination process.

The present process includes charging of limestone through a solids inlet at a charging end of a rotary kiln and, while moving the limestone through the kiln to a discharge end, contacting the limestone with a countercurrent flow of hot combustion gases resulting from the combustion of a carbonaceous fuel containing sulfur contaminants. A finely divided lime hydrate is charged to the rotary kiln adjacent the discharge end and is entrained in, and flows with, the hot combustion gases. The lime hydrate particles react with sulfur-containing contaminants, such as sulfur dioxide, in the hot combustion gases and also with sulfur-containing contaminants that are released from the limestone to produce lime hydrate-sulfur reaction products, such as finely divided calcium sulfate particles, which lime hydrate-sulfur reaction products remain entrained in the flow of hot combustion gases and are discharged from the rotary kiln, while a low sulfur content lime product is discharged from the rotary kiln at the opposite end.

The finely divided lime hydrate particles are of a particle size between 2.5–6.0 microns in diameter and are preferably injected into the rotary kiln at a location adjacent the flame resulting from combustion of the carbonaceous fuel in the kiln.

BRIEF DESCRIPTION OF THE DRAWINGS

The present invention will become more readily apparent from the following description of preferred embodiments thereof shown, by way of example only, in the accompanying drawings, wherein.

DETAILED DESCRIPTION

Figure 1:
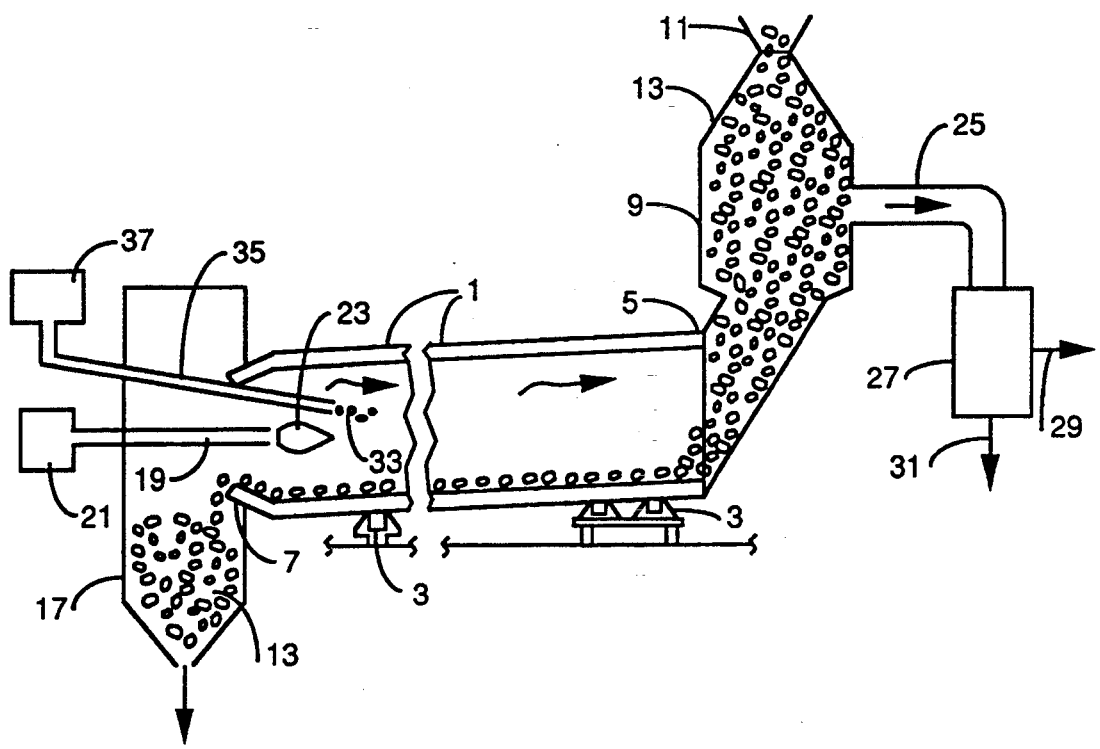
FIG. 1 is a schematic illustration of the present process.

In accordance with the present process, a finely divided lime hydrate is injected into a rotary kiln during calcination of limestone to lime in order to react with sulfur-containing contaminants that are released in the rotary kiln either by combustion of a fuel to provide the heat for calcination, such as a sulfur-containing coal, petroleum coke, or the like, or sulfur products that may be released from the limestone during the calcination.

In calcining limestone to produce lime in a rotary kiln, the limestone is charged at a solids charging end of the kiln and conducted through the rotary kiln, while a fuel is combusted at a discharge end of the kiln, where lime product is discharged, to provide heat for the calcination of the limestone to lime, with hot combustion gases passing through the rotary kiln countercurrent to the flow of the solids.

In the present process, in order to remove sulfur-containing contaminants from the gases in the rotary kiln, primarily sulfur dioxide, a finely divided lime hydrate is injected adjacent the discharge end, where combustion of the fuel is being effected. The lime hydrate particles are entrained in the hot combustion gases and react with sulfur-containing contaminants therein. The finely divided lime hydrate, injected into the gases where the temperature is about 1900°–2400° F., preferably at a temperature of between about 2000°–2300° F., will absorb sulfur dioxide from the hot combustion gas stream. Because of the finely divided nature of the lime hydrate, 6.0 microns or less, the lime hydrate particles react as follows:

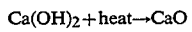

$$Ca(OH)_2 + heat \rightarrow CaO$$

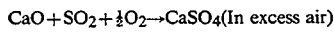

$$CaO + SO_2 + \tfrac{1}{2}O_2 \rightarrow CaSO_4 (\text{In excess air})$$

The calcium sulfate, $CaSO_4$, is stable at the above temperatures and is incorporated into the CaO particles. The size of the lime hydrate-sulfur reaction products is still about 6 microns or less and these products remain entrained in the flow of hot combustion gases. The hot combustion gases, containing the lime hydrate-sulfur reaction products are discharged from the solids charging end of the rotary kiln and are collected, along with fly ash and lime fines or other wastes in a baghouse or other fine solids collection device.

The lime hydrate particles that are injected into the hot combustion gases having sulfur-containing contaminants should be of a particle size of less than 6.0 microns, so as to assure entrainment thereof in the gaseous flow, as well as entrainment of the lime hydrate-sulfur reaction products in the gaseous flow. Preferably, the finely divided lime hydrate particles are of a diameter of about 2.5–6.0 microns, and most preferably between about 2.5–5.0 microns.

The amount of finely divided lime hydrate injected into the hot combustion gases will be determined by the amount of sulfur dioxide that will be present as a result of the combustion of the carbonaceous fuel having sulfur-containing contaminants. The molar ratio of finely divided lime hydrate to sulfur dioxide that will be present in the hot combustion gases should be between 1:3 and 3:1. Molar ratios in the range of 1:3 or above may be used where a relatively low sulfur content coal is combusted or where it is not necessary to remove all of the sulfur dioxide in order to produce a lime product of a desired low sulfur content, while ratios in excess of about 3:1 would be unnecessary and only increase the cost of operating the process.

The injection of the lime hydrate is made adjacent the discharge end for the lime product, where the combustion of the carbonaceous fuel having sulfur-containing contaminants is effected, and most preferably, the injection is made into the rotary kiln adjacently beyond the flame formed by the combustion. The flame is generally about 2600° F. or above, whereas the lime hydrate is to be injected at an area in the rotary kiln where the temperature is about 2400° F. or below. This enables fast conversion of the lime hydrate to CaO and an effective amount of time in the rotary kiln for reaction with sulfur-containing contaminants prior to discharge of the gaseous stream from the rotary kiln.

The lime hydrate particles that are injected into the rotary kiln may, if desired, also contain a minor amount of an additive that enhances the removal of sulfur dioxide from hot gaseous streams, such as a sugar or a lignosulfonate. Such additives are known for enhancing the removal of sulfur dioxide for gaseous mixtures, as for example described in U.S. Pat. No. 4,626,418 and U.S. Pat. No. 4,786,485, the contents of said two patents incorporated by reference herein. Such additives would normally be present in an amount of about 0.5 to 5.0 percent based on the weight of the lime and preferably in an amount of about 2.0–2.5 percent by weight.

In prior art calcination processes, it was often undesirable to preheat the limestone charged to the rotary kiln with hot combustion gases exiting the kiln because sulfur-containing contaminants in the gaseous stream could react with lime particles formed on the incoming limestone and be returned to the kiln. In the present process, however, the lime hydrate-sulfur reaction products produced, by reaction between the injected lime hydrate and the sulfur-containing contaminants are stable and will not react with the incoming limestone and preheating of the limestone by the exiting hot combustion gases can be effected.

Referring now to FIG. 1, the present process is illustrated where off-gases from the rotary kiln are used to preheat incoming limestone fed to the kiln. A rotary kiln 1 is shown with means to rotate the kiln, shown as rollers 3. The rotary kiln 1 has a solids charging end 5 for charging of limestone and a discharge end 7 for discharge of lime product. The limestone 9 is fed from a source 11 to a preheater vessel 13, charged at the solids charging end 5, and conducted through the rotary kiln and lime product 15 discharged from the discharge end 7 into a lime collection vessel 17, and discharged therefrom for storage or use. In order to provide heat to calcine the limestone to lime, a burner 19 is fed with a carbonaceous fuel from a source 21 and the fuel ignited and combusted in the rotary kiln 1 forming a flame 23. The carbonaceous fuel is principally coal, but may be other fuels such as petroleum coke, or a mixture of such fuels. The hot combustion gases produced flow countercurrent to the solids charge as indicated by the arrows in FIG. 1, with the hot combustion gases providing heat to calcine the limestone which then exit the rotary kiln 1, pass through the limestone charge 9 and are directed through a conduit 25 to a solids separator 27 such as a bag house, with clean gases discharged from the solids collector 27 through line 29 while collected solids are removed through line 31. Such a rotary kiln calciner is known in the art and need not be further defined.

In accordance with the present process, finely divided lime hydrate particles 33, of a diameter of 6 microns or less, are charged to the rotary kiln 1 through a charging means 35, such as a pneumatic charging device, from a source 37, at a location adjacent the discharge end 7 of the rotary kiln 1. The finely divided lime hydrate particles 33 are entrained in the hot combustion gases. With combustion of carbonaceous fuel having sulfur-containing contaminants, hot combustion gases having sulfur-containing contaminants are produced. When excess oxygen is present, such sulfur-containing contaminants in the hot combustion gases will be primarily sulfur dioxide. The lime hydrate particles 33 will react with the sulfur dioxide in the hot combustion gases to produce lime hydrate-sulfur reaction products, primarily calcium sulfate, and remove the sulfur dioxide so as to prevent reaction thereof with lime being produced by the calcination of the limestone. The lime hydrate-sulfur reaction products, as finely divided particles, will remain entrained in the hot combustion gases and will exit the rotary kiln 1 through the solids charging end 5. Since the lime hydrate-sulfur reaction products, such as calcium sulfate, are stable at temperatures of 2000°–2350° F., the hot combustion gases containing the same can be used to preheat incoming limestone 9 in the preheater 13 and the hot combustion gases with the still entrained finely divided solids are then directed through conduit 25 to the solids separator 27. In the solids separator, the lime hydrate-sulfur reaction products are separated from the combustion gases with the gases discharged through line 29 while collected solids are periodically removed through line 31.

Figure 2:
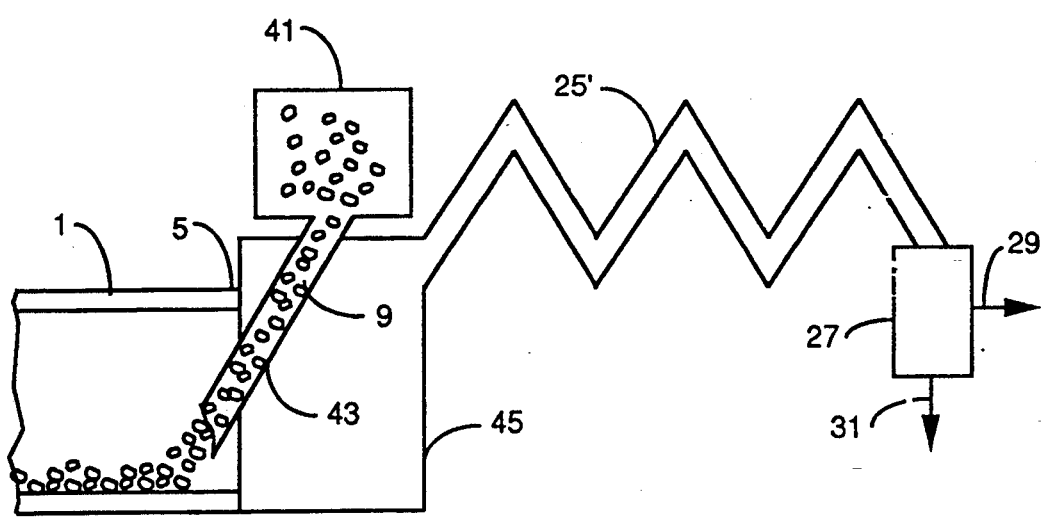
FIG. 2 is a schematic illustration of another embodiment of the present process where a direct contact preheater for the limestone charge is not used.

In the embodiment of the present process illustrated in FIG. 2, the limestone is charged to the rotary kiln 1 through solids charging end 5 but direct contact of the exiting hot combustion gases with the limestone charge is not made. The limestone 9 is charged from a source 41 through a charging chute 43, while the exiting hot combustion gases containing lime hydrate-sulfur reaction products are fed through a collector 45 to an air cooler, such as a convoluted air cooler line $25^1$ to solids separator 27, with cleaned gas discharged through line 29 and solids periodically discharged through line 31.

The present process, while usable in the embodiment of FIG. 2, provides extra advantages when used in the embodiment of FIG. 1, since the ability to use off-gases for preheating of the limestone is a distinct energy saver. In some processes of calcining limestone, for example, the expenditure of energy where heat recovery is made by preheating the incoming limestone with off-gases may be about 4.5 million BTUs per ton of lime produced, while where such heat recovery is not made and the heat lost, the expenditure of energy may be about 7 million BTUs per ton of lime produced. Thus, the removal of sulfur dioxide from the off-gases in the present process enables the use of the off-gases for preheating incoming limestone without contamination of the charge with sulfur in the gases, and results in significant savings in energy required to produce lime as well as the production of a low sulfur content lime of less than about 0.1 percent by weight of sulfur.

It is expected that, with injection of finely divided lime hydrate particles into the hot gaseous stream as much as 80–90 percent of the sulfur dioxide present in the gas stream from combustion of sulfur-containing coal can be absorbed and removed which would result in the formation of a very low sulfur content lime product.

What is claimed is:

1. A process for calcining limestone in a rotary kiln using hot combustion gases from carbonaceous fuels having sulfur-containing contaminants to produce a low sulfur content lime product, comprising:

charging limestone at a solids charging end to a rotary kiln and conducting the same therethrough;
   charging the carbonaceous fuel having sulfur-containing contaminants to said rotary kiln and combusting the fuel to produce hot combustion gases having sulfur-containing contaminants, and conducting said gases therethrough countercurrent to the passage of said limestone to calcine said limestone and produce a lime product;
   discharging said lime product so produced from said rotary kiln at a discharge end opposite said solids charging end;
   injecting finely divided lime hydrate particles, of a particle size of 6.0 microns or less, into said kiln adjacent said discharge end so as to entrain said lime hydrate particles in said gases, whereby said lime hydrate particles react with said sulfur-containing contaminants to produce lime hydrate-sulfur reaction products which remain entrained in said gases, and said lime product is of a low sulfur content;
   discharging said gases, containing said lime hydrate-sulfur reaction products from said rotary kiln at a location adjacent said solids charging end of the rotary kiln;
   separating said lime-sulfur reaction products from said gases; and
   removing said lime-sulfur reaction products.

2. The process for calcining limestone as defined in claim 1 where said finely divided lime hydrate is of a particle size of between about 2.5–6.0 microns in diameter.

3. The process for calcining limestone as defined in claim 2 where said finely divided lime hydrate is of a particles size of below 5 microns in diameter.

4. The process for calcining limestone as defined in claim 1 wherein said finely divided lime hydrate is added in a ratio of between 1:3 and 3:1 of sulfur dioxide present in said hot combustion gases.

5. The process for calcining limestone as defined in claim 1 wherein said limestone is preheated prior to introduction into said rotary kiln by passage of hot combustion gases discharged from said rotary kiln through a charge of said limestone.

6. The process for calcining limestone as defined in claim 1 wherein said finely divided lime hydrate is injected into said kiln adjacently beyond a flame formed by the combustion of said carbonaceous fuel within said rotary kiln.

7. The process for calcining limestone as defined in claim 1 wherein said lime hydrate contains a minor amount of a sugar.

8. The process for calcining limestone as defined in claim 1 wherein said lime hydrate contains a minor amount of a lignosulfonate.

9. The process for calcining limestone as defined in claim 1 wherein said carbonaceous fuel is coal.

10. The process for calcining limestone as defined in claim 1 wherein said carbonaceous fuel is a mixture of coal and petroleum coke.

11. A process for calcining limestone in a rotary kiln using hot combustion gases from a sulfur-containing coal to produce a low sulfur content lime product, comprising:

charging limestone at a solids charging end to a rotary kiln and conducting the same therethrough;
    charging the sulfur-containing coal to said rotary kiln and combusting the coal in the presence of excess air to produce hot combustion gases having sulfur dioxide, and conducting said gases therethrough countercurrent to the passage of said limestone to calcine said limestone and produce a lime product;
    discharging said lime product so produced from said rotary kiln at a discharge end opposite said solids charging end;
    injecting finely divided lime hydrate particles, of a particle size of 6.0 microns or less, into said kiln adjacent said discharge end so as to entrain said lime hydrate particles in said gases, whereby said lime hydrate particles react with said sulfur dioxide to produce calcium sulfate which remains entrained in said gases, and said lime product is of a low sulfur content;

discharging said gases, containing said calcium sulfate from said rotary kiln at a location adjacent said solids charging end of the rotary kiln;

separating said lime-sulfur reaction products from said gases; and removing said lime-sulfur reaction products.

12. The process for calcining limestone as defined in claim 11 where said finely divided lime hydrate is of a particle size of between about 2.5–6.0 microns in diameter.

13. The process for calcining limestone as defined in claim 12 where said finely divided lime hydrate is of a particles size of below 5 microns in diameter.

14. The process for calcining limestone as defined in claim 11 wherein said finely divided lime hydrate is added in a ratio of between 1:3 and 3:1 of sulfur dioxide present in said hot combustion gases.

15. The process for calcining limestone as defined in claim 11 wherein said limestone is preheated prior to introduction into said rotary kiln by passage of hot combustion gases discharged from said rotary kiln through a charge of said limestone.

16. The process for calcining limestone as defined in claim 11 wherein said finely divided lime hydrate is injected into said kiln adjacently beyond a flame formed by the combustion of said carbonaceous fuel within said rotary kiln.

17. The process for calcining limestone as defined in claim 11 wherein said lime hydrate contains a minor amount of an additive selected from the group consisting of sugar and a lignosulfonate.

* * * * *